Figure 1:
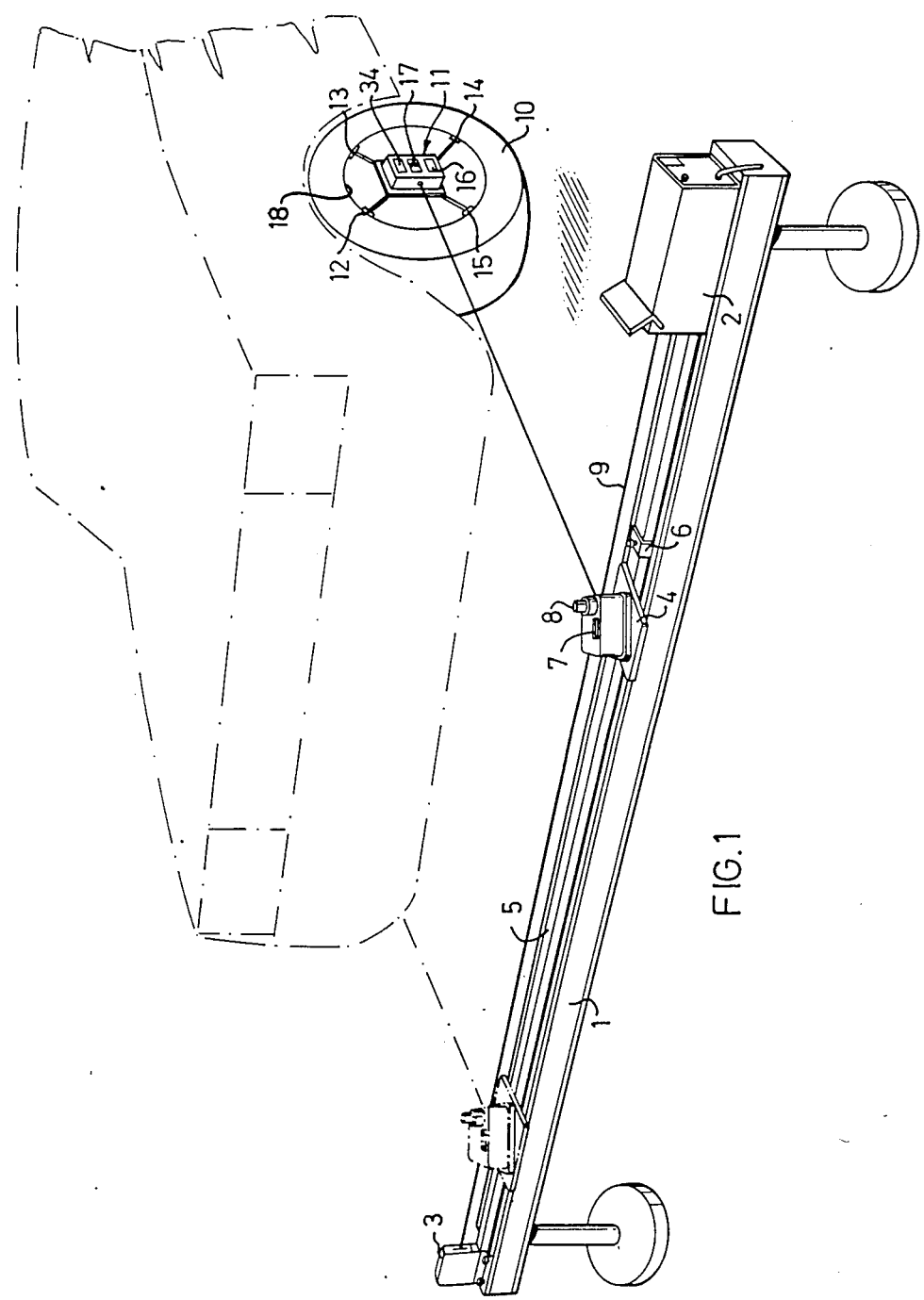

United States Patent [19]

Wiklund

[11] Patent Number: 4,690,557

[45] Date of Patent: Sep. 1, 1987

[54] ARRANGEMENT FOR MEASURING WHEEL ALIGNMENT AND STEERING GEOMETRY IN AN AUTOMOBILE

[75] Inventor: Klas R. Wiklund, Täby, Sweden

[73] Assignee: Nicator AB, Sweden

[21] Appl. No.: 742,703

[22] Filed: Jun. 7, 1985

[30] Foreign Application Priority Data

Jun. 28, 1984 [SE] Sweden .............................. 8403456

[51] Int. Cl.$^4$ .......................................... G01B 11/275
[52] U.S. Cl. ...................................... 356/155; 33/288
[58] Field of Search ......................... 33/288, 335, 336; 356/152, 154, 155

[56] References Cited

U.S. PATENT DOCUMENTS

| | | | |
|---|---|---|---|
| 3,963,352 | 6/1976 | Rishoud et al. ........................ | 33/336 |
| 4,115,007 | 9/1978 | Thiele et al. ......................... | 356/155 |
| 4,135,823 | 1/1979 | Horvallius ............................ | 356/155 |
| 4,466,196 | 8/1984 | Woodruff .............................. | 33/288 |
| 4,574,490 | 3/1986 | Curchod .............................. | 33/288 |

*Primary Examiner*—F. L. Evans
*Attorney, Agent, or Firm*—Larson and Taylor

[57] ABSTRACT

The invention relates to an arrangement for measuring wheel alignment and steering geometry in an automobile. A substantially horizontal bar is placed in front of the vehicle at right angles to its longitudinal axis. A light source displaceable along the bar emits a narrow ray of light at an angle to the bar. The vehicle front wheel to be measured is provided with a unit including at least three angle sensors of which at least one comprises a widely dimensioned light detector placed in the focal plane of an optical means. The light source on the bar is set to a position on said bar where the emitted light beam strikes the optics approximately at the center thereof. A calculating device determines the wheel alignment values with the aid of the angle sensor signals for variable positions of the wheel and the motion of the light source along the bar.

15 Claims, 3 Drawing Figures

ARRANGEMENT FOR MEASURING WHEEL ALIGNMENT AND STEERING GEOMETRY IN AN AUTOMOBILE

The present invention relates to an arrangement of the kind for measuring wheel alignment and steering geometry in an automobile of the type having a longitudinal axis and opposed first and second front wheels, wherein each wheel is mounted on a rim.

Collision damages many times affect the wheel suspension of an automobile, resulting in incorrect wheel geometry. Since modern automobile production is based on the method of making the body self-supporting, this means that defects on the attachment points must often be set right by changing the entire body, i.e. the body has to be "drawn" right. This work is often carried out in a straightening bench, whereas the wheel alignment checking takes place in a separate measuring unit. In this connection there has arisen the demand for an arrangement which eliminates the need of moving the vehicle in order to measure the wheel alignment, but making it possible instead to utilize an already existing straightening bench provided with an optical measuring system for measuring the dimensions of the wheel body. Such a procedure would be labor-saving while affording accurate alignment values, since any possible fault could then be immediately corrected.

A solution to this problem has now been found with an arrangement according to the invention, which comprises an arrangement for measuring wheel alignment of the type set forth above, including a horizontal bar placed in front of the vehicle and essentially at right angles to its longitudinal axis, a light emitting means mounted on the bar and emitting a narrow ray of light at a predetermined angle to the bar. A measuring unit is attachable to the rim of the wheel and it forms an optical path which receives and focuses the light ray at a focal plane. The measuring unit includes at least three angle sensors which detect angular deviations in different planes, and at least one of which includes a widely dimensioned light detecting means located at the focal plane for detecting the light ray focused at that point. The invention further includes a means for detecting the location of that point and a calculating means which receives output signals from said angle sensors to calculate wheel alignment.

An optical measuring system, which is well adapted for this purpose when used together with a straightening bench for an automobile, is the system incorporated in the straightening bench marketed under the trade name "Dataliner 80", which is described in U.S. Pat. Nos. 2,213,963; 4,556,322 and 4,441,818 and United Kingdom Pat. No. 2,075,185B. the inventive arrangement, said system comprises in its most simple embodiment a bar, which upon application of the inventive measuring device is to be placed in front of the vehicle and substantially at right angles to the longitudinal axis thereof. A laser beam is emitted in parallel alongside the bar. One or two deflection units are arranged to deflect the laser beam towards the vehicle at an angle to the bar. In the most simple embodiment this angle is perpendicular, but in some applications it can be set to several, for example five accurate angular positions. Each deflection unit is displaceable along the bar, and the movements can be recorded either manually or automatically. As already mentioned, a measuring bar of this type can be placed as a supplementary part in connection with a straightening bench, although it is of course also conceivable within the scope of the invention for such a measuring bar to have a separately detached position in front of the vehicle.

With the aid of the inventive arrangement, the angular position of a wheel is measured in three mutually different directions which are not lying in the same plane. With the guidance of the angles thus obtained, measured with the wheel turned in various positions in relation to the longitudinal axis of the vehicle, determinations can be effected on the Camber angle, i.e. the tilt of the wheel from the vertical plane; the king pin inclination; the Caster angle, i.e. the tilt of the front axle; the toe-in value, i.e. the pointing inward of the front wheels; the toe-out angle, i.e. the cornering angle; and the symmetry of the vehicle front.

The invention will be described in more detail below while referring to the accompanying drawings, where FIG. 1 shows an embodiment of a measuring device according to the invention, placed beside and onto an automobile.

Figure 2:
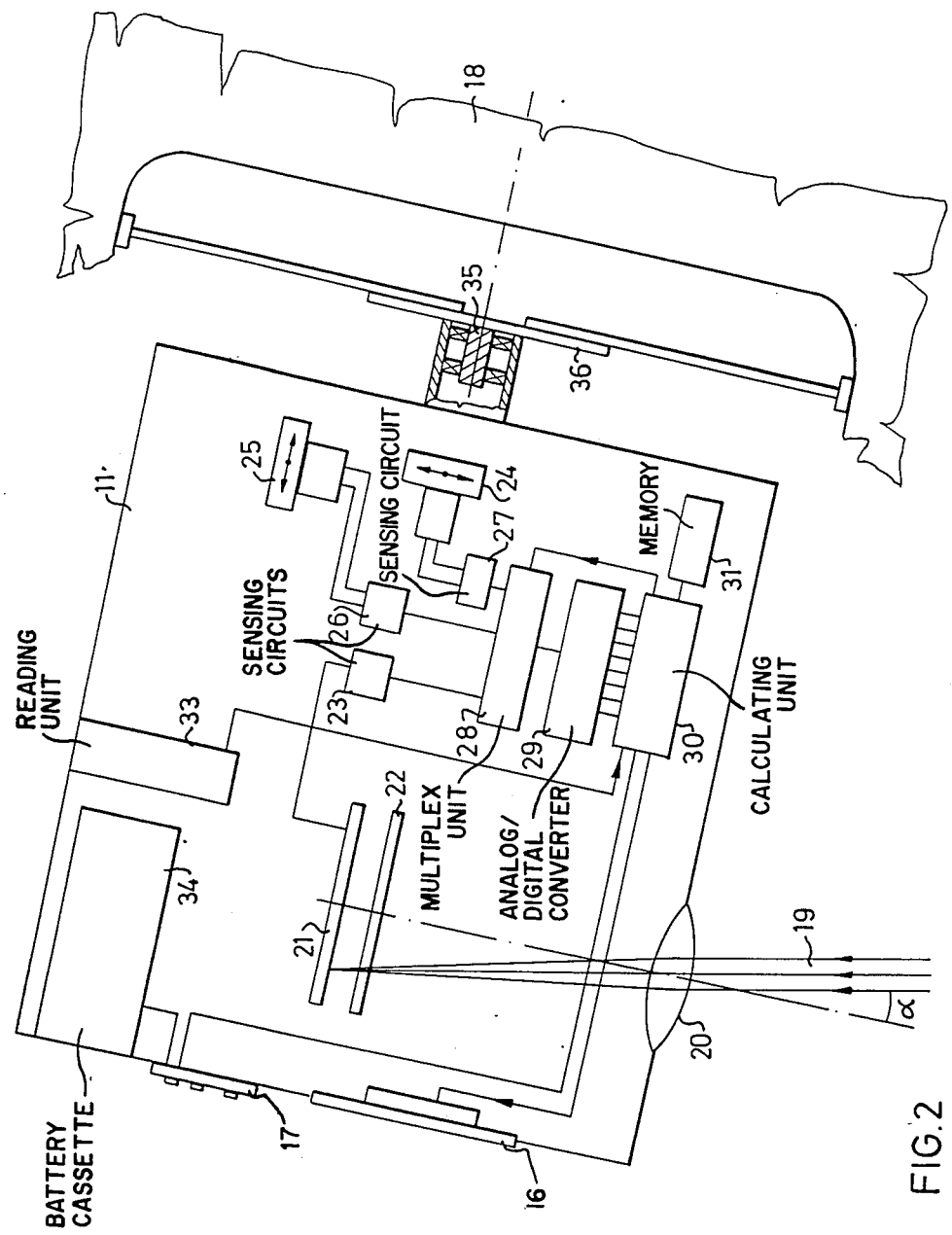
Figure 3:
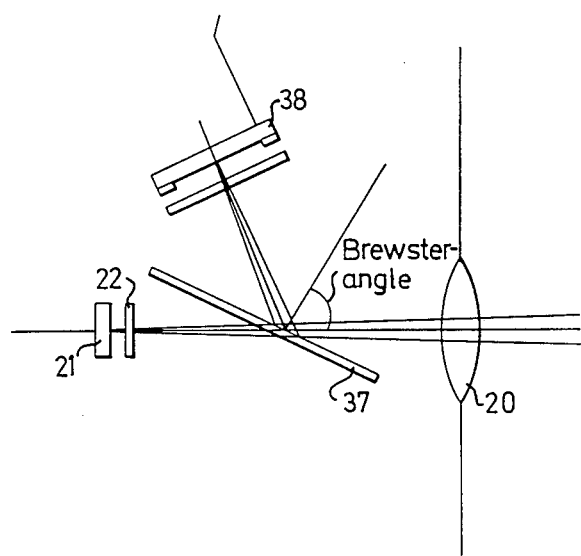

FIG. 2 shows schematically a plan view from below, with the lower side of the housing removed, of a first embodiment of the unit incorporated in the inventive arrangement while attached to the wheel rim, and FIG. 3 shows schematically a side view, as seen facing towards the wheel, of a second embodiment of an angle measuring unit included in the unit situated on the wheel rim.

FIG. 1 illustrates a measuring bar 1 with a light source 2 disposed at one end thereof. The essential feature of the radiation source 2 is that the emitted radiation is narrow, visible and collimated. Suitable for this purpose is an HeNe laser. The other end of the bar accommodates a unit 3 upwardly projecting therefrom and provided with a marking. The lateral and vertical setting of the light source 2 is adjusted so that the emitted ray strikes the marking on the unit 3, which will cause the ray to run parallel with the bar. A deflection unit 4, intended to deflect at least part of the radiation from the light source 2, is displaceable along said bar. Its movement along the bar can be measured e.g. by providing the unit 3 with a measuring tape 5, which is secured at its outer end to an end clamp 6 displaceable along the bar and lockable thereto, said clamp being settable anywhere along the bar to give a reference value. This property is described in Swedish patent specification No. 7103780-8. Instead of using a measuring tape, the bar itself can be provided with magnetic or optical markings, and the deflection unit may incorporate a reading unit for automatic reading of the movements of the unit 4 along the bar, as described in United Kingdom Pat. No. 2,075,185B.

The deflection unit 4 is adjustable so that the ray from the light source 2 is bent in a horizontal plane, preferably at 90° to the bar. On that side of the deflection unit which is shown turned away in the figure and toward the automabile, there is disposed a unit (not shown) by means of which the ray emanating from the deflection unit 4 can be vertically set to any selected angular position. The unit 4 can also be designed to make the emitted ray adjustable for providing a few additional predetermined angular positions other than 90° to the bar.

The wheel 10 is provided with a displaceable measuring unit 11 fixed to the wheel rim by means of four attachments 12-15 which are pressed against the inner edge of the rim, for example by providing each attachment with a rotatably controllable expansion bolt, or by the attachments being slightly resilient, the measuring unit then being applicable with the aid of a mechanical fastening means. The attachment, as well as the fastening means, can be designed in a plurality of different ways but is not described in more detail as it does not form part of the actual invention. To advantage, the fastening means is so designed that the reference area of the measuring unit facing towards the rim is well defined in relation to the rotational plane and center of the wheel in order to minimize the working moments, although measurements can be carried out even without the accomplishment of said condition, as explained below.

The unit 11 is provided at its outside with an indicator 16 such as a numerical indicator for example, displaying the results of measurements performed, as will be explained below. There is also a keyboard 17 or the like which is controlled by the operator.

FIG. 2 illustrates schematically a first embodiment of a unit 11 fixed to a rim 18 of a vehicle front wheel. The wheel is shown while turned a certain angle $\alpha$ to the longitudinal axis of the vehicle. The figure shows the unit 11 as viewed from below with the lower side of the housing removed. It should be observed that the dimensions shown do not correspond to those of an actual arrangement.

A beam of light 19 from the deflection unit 4 in FIG. 1 strikes an optical system, shown here in the form of a positive lens 20 focusing the radiation onto a linear light detector 21, which detects the position of the striking point. The angle of incidence is $\alpha$ to the optical axis of the optics 20. A narrow optical band pass filter 22 filters off incident scattered light. Elements 20, 21 and 22 also act as an angle sensor. The output signal from the detector 21 is fed to a sensing circuit 23 for amplification and, if desired, a first processing of the signal. In the embodiment illustrated in FIG. 2 there are furthermore two additional angle sensors 24 and 25; the sensor 24 measuring the deviation in relation to a vertical plane through, or parallel with the wheel axis, and the angle sensor 25 measuring the deviation in relation to a vertical plane perpendicular thereto, i.e. if the measuring unit 11 is placed parallel to the wheel center plane, the angle sensor 25 will measure the wheel inclination in relation to a vertical plane provided that the signal from the angle sensor 24 is 0.

A suitable sensor constituting the angle sensors 24 and 25 can be of the pendulum type such as the basic type shown for example in U.S. Pat. No. 4,277,895. The analog output signals from the angle sensors 24 and 25 are each fed to its own individual sensing circuit 26,27 acting to servo-control the sensors while producing at its output an analog signal in response to the servo-set angular position.

The outputs of the three sensing circuits 23,26,27 are each connected to their respective input of a multiplex unit 28. The output of the multiplex unit 28 is connected, via an analog/digital converter 29, to a calculating unit 30, preferably a microcomputer serving to control during measurement the multiplex unit 28 for successively transmitting the signals from the sensing circuits 23,26,27 to the calculating unit for temporary storage in a memory 31.

The calculating unit determines the various wheel setting values based on the values stored in the memory, with regard to the signals received from the sensing circuits at different turns of the wheel, as will be explained below, these values being displayed on a numerical indicator 16. The operator controls what values are to be indicated and processed via a keyboard 17, by means of which the unit 11 is switched on, as is illustrated in the figure by a line leading to a cassette 34 provided with batteries for the supply of power to the electric components. No power supply lines from the battery to the various components are shown however, but do of course exist in reality. Furthermore, the unit 11 may incorporate a reading unit 33 into which is inserted at the beginning of each measurement sequence a magnetic card, a punched card or the like including data for the actual car model subjected to measurement. These data are fed to the calculating unit 30 to be stored in the memory 31.

By means of the keyboard 17 it will be possible to feed values into the calculating unit with regard to alternative settings of the deflection unit(s) 4 on the bar 1, which can be utilized by the calculating unit 30 when determining certain of the wheel setting values, as will be described below. In those cases where the movements of the deflection unit(s) 4 along the bar are automatically read, these values can of course be transmitted by wireless or coupled connection (not shown) to the calculating unit 30.

FIG. 2 illustrates the unit 11 tightly journalled on a shaft 35 mounted on a plate secured to the rim. In this way any possible error in the attachment of the unit to the rim can be eliminated by performing each measurement sequence as two or more partial measurements, so that if the initial partial measurement is followed by two partial measurements for example, the operator holds the unit 11 with one hand to prevent rotation thereof, while rotating the wheel half a revolution, whereupon the unit 11 is reattached and the second partial measurement is performed. With the guidance of the deviations between the angle values obtained from the two partial measurements, the calculating unit 30 will be able to compensate for the attachment fault in accordance with conventional geometric calculation methods, and determine the values that would have been obtained with proper attachment, while also informing about any possible deformation or attachment fault of the rim. To advantage, a measuring sequence could commence in checking whether the attachment is warped by rotating the wheel in relation to the unit 11, during some parts of a revolution, adjusting the inclination of the unit 11 to the plate 36 with the aid of a few set screws (not shown) in order to facilitate subsequent measurements. In the following discussion, measurements made with the inventive arrangement will be described as if only one single measurement per measuring operation would be required, although it is understood that each measurement sequence may comprise two or more partial measurements with the wheel turned in different positions relative to the unit 11.

In order to simplify operation of the calculating unit 30, the angle sensor 24 sensing the rotary position of the wheel may instead be a level whereby the operator, for each measuring cycle, fits the unit 11 together with the wheel so that its upper side is horizontally oriented along the wheel. It should be noted in this connection that the mounting of the unit 11 on the shaft 35 should be fitted tightly enough for preventing said unit from rotating freely in relation to the wheel.

Measurement of the various alignment angles can be carried out in the following manner. The Camber angle, i.e. the wheel inclination, is most simply measured by positioning the wheel in parallel with the longitudinal axis of the vehicle. The wheel is thereby first roughly set by the operator, whereafter the deflection unit is moved along the bar until the ray of light strikes the lens 20 approximately at the center. The operator then presses a key indicating that all three angles from the angle sensors are continually displayed on the indicator means 16, and performs a fine adjustment by turning the wheel inwards so that the readings from the angle sensors 24 and 20-22 are 0; the reading from the angle sensor 25 thereby indicating the Camber angle. It is also possible to include in the calculating unit 30 a program enabling the Camber angle to be immediately determined, employing geometric methods for the values from the three angle sensors obtained directly upon the wheel being roughly set.

Measurement of the Caster angle, i.e. the tilt of the axle, and the king pin inclination are somewhat more complex procedures. These angles are normally measured by optical meters from the rear of the wheel, which is rather difficult. In applying the invention advantage is taken of the fact that wheel inclination varies at different outward tilts, i.e. skews of the wheel due to the Caster angle and steering axis inclination. These angles can thus be determined by employing geometric relations known per se in that measurement is made, and the angle values received from the sensors 24, 25 and 20-22 are indicated with the wheel in three different outward tilt positions, of which one may then represent a setting parallel to the longitudinal axis, as when measuring the Camber angle, the measuring result of which can be utilized here, whereas the other position can be a relatively large outward tilt on the order of about 15-20 degrees to one direction or the other. The geometric interrelation varies somewhat with different car makes having individual types of front wheel suspensions, and this relationship can therefore be programmed into the magnetic tape or punched card for insertion into the reader 33 of the unit 11 before commencing a measuring sequence. The different interrelated values are thereby suitably based on measurements with unloaded front springs and with the vehicle in raised position Upon termination of a measuring sequence, the calculating unit 30 determines the Caster angle and the king pin inclination while employing the fed-in relationship values by inserting the measurement results from the angle sensors 24,25 and 20-22, the final result being displayed on the indicator 16.

The toe-in value is determined by centering the steering wheel to accomplish a substantially straight ahead position of the front wheels, the deflection unit 4 being moved along the bar so that the deflected ray strikes the optics of the measuring unit 11, situated on one wheel. The wheel is preferably rotated until the angle sensor 24 indicates the 0° position whereafter the value received from the angle sensor 20-22 is stored, possibly after making two partial measurements forming together an average value, as mentioned above. The deflection unit 4 is then moved to the other end of the bar and is directed towards another measuring unit 11 of a type similar to the first one, the same measurements being made for this wheel as well. Instead of using a second unit 11, one and the same unit 11 may be used for displacement between the wheels. If one and the same unit 11 is used, the new values obtained on measurement of the second wheel are directly fed in for storage in the same memory 31 as those values obtained from the first measurement. When using two units, the second unit may instead be equipped with a relatively simple calculating unit and an emitter for either wireless or wire-connected transmission of data from the three angle meters to the calculating unit in the first measuring unit, for final determination of the specific wheel setting values. This does not particularly appear in the figures but is apparent to any one skilled in the art. The primary object of the invention is that the result from the measuring sequences, comprising partial measurements on both wheels, be processed in one and the same calculating unit regardless of this being placed in one or the other unit 11 or, as a possible alternative, in a central unit having the form of a portable box for example (not shown), coupled to units on both front wheels, and if desired, for example, also to the deflection unit on the bar via a wire connection, for example.

From the reading unit 33 information on wheel dimension has been forwarded to the calculating unit 30, and the inward tilt, i.e. the so-called toe-in value, is determined with the guidance of the values for the two wheels obtained from the angle sensors 20-22 and the wheel dimension.

In connection with the above-described moment of measuring the toe-in value, measurement of the front axle center line may to advantage take place in the same measuring sequence in order to check that the distance from said central position is equal for both front wheels.

The toe-out angle, i.e. the relative angular position of the front wheels on turns, is often specified in the instructions for the respective car model instead of estimating the degree of the inner wheel turn when the outer wheels turns 20°. The simplest method of measuring this value is to set the deflection unit so that the deflected ray is bent 20° to the bar, roughly setting the turn of the wheels, placing the deflection unit at the point of the bar where the ray strikes the optics 20 of the unit 11 on the outer wheel, finely setting the alignment of this wheel so that the signal from the angle sensors 20-22 and 24 is 0, moving the deflection unit until the deflected ray strikes a unit 11 on the inner wheel, setting this unit so that the signal from the sensor 24 is 0, reading the angle received from the angle sensor 20-22, and adding 20 degrees thereto. If the deflection unit cannot be exactly set to 20° deflection, the calculating unit may have a conversion table registered in the memory 31, for example, enabling the calculating unit to perform a conversion to obtain the value of the inner wheel turn when the outer wheel is turned 20°, in case the above-mentioned measuring sequence is performed with the deflection unit set at the adjustable deflection angle lying closest to 20°.

FIG. 3 is a lateral view of another embodiment of the angle sensor configuration for a unit situated on the wheel, illustrating a specific angle sensor intended to measure the turn of the wheel in relation to the longitudinal axis of the vehicle; firstly the wheel inclination relative to a vertical plane, and secondly the turn of the unit relative to a horizontal line parallel to the wheel with the aid of one and the same unit, which utilizes the bundle of rays emitted by the deflection unit 4.

FIG. 3 illustrates the same units 20,21 and 22 as those shown in FIG. 2. In the ray path between the optics 20 and the filter 22, a glass plate 37 is suitably disposed for the incident beam of rays in the normal position of the unit 11 to strike said plate at the so-called Brewster angle, which is about 56° for glass. The beam of rays is partially reflected by the plate 37 towards a linear sensor 38 of essentially the same type as the sensor 21. The arrangement with the linear sensor 38 will then replace the angle sensor 24 shown in FIG. 2. The sensors 21 and 38 must have a certain width to prevent the measuring beam from falling outside said sensors, which could otherwise happen. The sensor 38 is disposed in the focal plane for the radiation deviated by the plane.

It should be observed that the radiation bent off by the deflection device need not lie in a horizontal plane but may be turned upwards or downwards a predetermined angle by means of a turning wheel (not shown) on said device. This angle is readable and can be programmed into the memory 31 via the keyboard, for example. Said angle can be adjustable, obviating in this way the need of raising or lowering the vehicle for the accurate verticle setting in order to measure wheel alignment, but the light beam is instead angularly oriented towards the optics. This can be done in accordance both with the embodiment of FIG. 2 and with that of FIG. 3. In the latter embodiment however, the ray must be finely adjusted vertically for each measuring cycle so that it strikes exactly the same point of the optical means, which can be specifically marked, the finely adjusted value being read and the value registered by the sensor 38 being adjusted in response thereto.

If the radiation emitted by the deflection unit 4 on the bar is linearly polarized with known polarization, both parallel with and perpendicularly to the plane of incidence, the ratio between the intensities of the two rays striking the sensor 21 and the sensor 38 will represent an unambiguous function of the angular deviation from the Brewster angle of the radiation striking the glass plate 37. Because two of the angles in a perpendicular three-dimensional coordinate system are known from the signals representing the striking points on the linear sensors 21 and 38, the third angle can be determined on the knowledge of the value obtained with the guidance of said ratio. The calculating unit may comprise a partial program designed to perform this calculation.

Many modifications are conceivable within the scope of the invention. For example, the sensor 21 shown in FIG. 2 can be vertically adjustable to allow perpendicular displacement relative to the plane of the paper, if the ray 19 emanating from the deflection unit 4 is vertically adjusted to make sure that the sensor 21 will be hit by the ray 19. The sensor 21 need not therefore be widely dimensioned. It should be observed that this vertical adjustment can also be utilized as an angle sensing means instead of the angle sensor 24 in that the angle, sensed by the angle sensor 24, is an assembly of the deviation of the ray 19 from a horizontal plane and the striking point of the ray 19 vertically in a plane perpendicular to the plane of the paper, comprising the sensor 21 in FIG. 2. To be useful for this purpose, the sensor 21 should have a narrow shape enabling an accurate fine adjustment thereof.

Instead of a light source 2 such as a laser placed at one end of the bar and a device 4 deflecting the radiation of the light source towards the vehicle, said device 4 per se may include a light source the radiation of which is directed towards the vehicle.

I claim:

1. An arrangement for measuring wheel alignment and steering geometry in an automobile of the type having a longitudinal axis and opposing first and second front wheels, wherein each wheel is mounted on a rim, including:

a subtantially horizontal bar placeable in front of the vehicle and essentially at right angles to its longitudinal axis, at least one light emitting means placed on and displaceable along said bar, for emitting a narrow ray of light at a predetermined angle to said bar, a measuring unit attachable to the rim, said measuring unit having means for forming an optical path, means in said optical path for receiving and focusing said light ray at a focal plane, at least three angle sensor means in each measuring unit for detecting angular deviations in three diverging directions, all three directions lying in different planes from each other, each angle sensor means having means for delivering an output signal, at least one of said angle sensor means comprising a widely dimensioned light detecting means placed in said focal plane for detecting said light ray focused at a point in said plane, means for detecting the location of said point of said focused ray on said light detecting means and calculating means, means for providing the output signal of said angle sensor means to said calculating means, said calculating means including means for calculating wheel alignment values in response to said output signals from said angle sensors obtained at different rotational positions of the wheel.

2. An arrangement according to claim 1, including a memory unit provided in said calculating means for temporarily storing data referring to both of the front wheels of the automobile, said calculating means having means for determining wheel alignment from data received from both wheels.

3. An arrangement according to claim 2, including a measuring unit on both front wheels, including only one said calculating means for both of said units.

4. An arrangement according to claim 1, including attachment means for fixing the measuring unit to the rim, said attachment means comprising a shaft projecting outwardly from and substantially perpendicular to the plane of the wheel rim, at least a portion of the unit provided with the said angle sensor means being rotatably journalled on said shaft.

5. An arrangement according to claim 1, including read-in means connected to said calculating means for providing read-in information on an information bearing means insertable in said read-in unit.

6. An arrangement according to claim 5, wherein said read-in unit is constructed to receive and read information on a magnetic card.

7. An arrangement according to claim 5, wherein said read-in means is constructed to receive and read information on a punched-card.

8. An arrangement according to claim 5, said read-in means including means for reading formulas for calculating the wheel alignment values in the calculating means, which formulas are specifically adapted to the automobile model, the alignment of which is being measured.

9. An arrangement according to claim 5, wherein the read-in means includes means for reading data based on measurements from a reference automobile similar to the actual automobile, the wheel alignment of which is being measured.

10. An arrangement according to claim 1, wherein one of the angle sensor means comprises means for indicating the rotation of the wheel about its axis.

11. An arrangement according to claim 10, wherein the last said angle sensor means comprises a level.

12. An arrangement according to claim 1, wherein at least one of said angle sensor means is of the eccelerometer type.

13. An arrangement according to claim 1, wherein two of the angle sensor means are each in the form of an elongated sensor, arranged on a common optical system, and including a beam divider in the beam path of the optical system, immediately behind the optics of said system, arranged to deflect a part of the light ray radiation toward one of the angle sensor means, the other angle sensor means being disposed in the direction of the incident radiation.

14. An arrangement according to claim 13, wherein the said beam divider is a glass plate with a Brewster angle set to an optical axis of said optical system.

15. An arrangement according to claim 13, wherein the incident radiation is linearly polarized and said calculating means includes means for calculating the ratio between the potentials of the radiation striking the two angle sensor means, and wherein said calculating means further includes means for calculating the angle of the third angular sensor means using said ratio of the values from the first two angle sensor means.

* * * * *